US 6,671,618 B2

(12) United States Patent
Hoisko

(10) Patent No.: US 6,671,618 B2
(45) Date of Patent: Dec. 30, 2003

(54) NAVIGATION SYSTEM

(75) Inventor: Jyrki Hoisko, Oulu (FI)

(73) Assignee: Nokia Corporation, Espoo (FI)

( * ) Notice: Subject to any disclaimer, the term of this patent is extended or adjusted under 35 U.S.C. 154(b) by 15 days.

(21) Appl. No.: 10/015,546

(22) Filed: Dec. 13, 2001

(65) Prior Publication Data

US 2002/0111737 A1 Aug. 15, 2002

(30) Foreign Application Priority Data

Dec. 20, 2000 (GB) ................................................ 0031110

(51) Int. Cl.⁷ ................................................ G06F 7/00
(52) U.S. Cl. ...................................... 701/205; 701/209
(58) Field of Search ................................ 701/200, 201, 701/205, 209, 300, 302

(56) References Cited

FOREIGN PATENT DOCUMENTS

| GB | 2287535 | 9/1995 |
| GB | 2298539 | 9/1996 |

OTHER PUBLICATIONS

ETSI (European Telecommunications Standards Institute) technical specification "Location Services", GSM 03.71 or 3GPP Spec. No. 3GTS23.171, version 3.1.0 "Location Services", 1997.

"Tactile Information Presentation: Navigating in Virtual Environments" by van Erp. pp. 11–14, TNO Human Factors, Soesterberg, The Netherlands, no date.

*Primary Examiner*—Richard M. Camby
*Assistant Examiner*—Edward Pipala
(74) *Attorney, Agent, or Firm*—Ware, Fressola, Van Der Sluys & Adolphson LLP

(57) ABSTRACT

A navigation system comprises at least one tactile actuator. The tactile actuator is adapted to provide tactile navigation stimulus for the user of the system. A controller is provided for controlling the operation of the at least one tactile actuator based on information associated with the position of the user. In operation the position of the user and the direction to which the user should move are determined. The user is then guided by means of the tactile navigation stimulus. The navigation system may be implemented as a portable navigator apparatus that comprises at least one tactile actuator and a controller. The portable navigation apparatus may also comprise means for determining information associated with the position of the user.

40 Claims, 4 Drawing Sheets

NAVIGATION SYSTEM

FIELD OF THE INVENTION

The present invention relates to navigation, and in particular, but not exclusively, to provision of navigation guidance for a user of a navigation device. The invention relates further to a portable navigation apparatus.

BACKGROUND OF THE INVENTION

Navigation is required in various situations. For example, a person who wants to get to a predefined location from another location needs typically to perform some navigation such as orienteering in order to know which direction he/she should move to in order to get to the destination. In a simple form navigation may be based e.g. on an instinct or actual knowledge of directions, based on landmarks and so on. It is also possible to use navigation aids such as a compass and/or a map and so on. The general concept of navigation as well as conventional navigation aids are known, and are thus not discussed herein in more detail. It is sufficient to note that navigation and/or use of navigation aids is something most people need to do every now and then. The possible users of different navigation aids include users such as the police and rescue workers, drivers, hikers, people picking berries, hunters and so on. Sailors form a group of users that is heavily dependent on navigation skills and aids.

Navigation is needed by various groups of people, also by those who are not located outside urban areas. As a matter of fact, people need often to navigate also in urban environments, for example when in a unknown city. Following a map may slow down the user as he may need to stop every now and then to read the map, for example to locate himself on the map and to check that he is heading in the right direction. The use of a map may even be dangerous, e.g. in a busy city environment where the user should pay attention to the other pedestrians, traffic and obstacles on the streets. Use of a map while driving a car can be especially obstructive, and may, indeed, be against the law in some jurisdictions.

In addition to conventional maps and compasses, other navigation aids have also been developed. For instance, electronic maps have been introduced. Electronic navigator devices have also been suggested. One of the recent developments include a handheld GPS (Global Positioning System) navigator. The GPS is based on use of satellites, the arrangement being such that a GPS device on the ground determines its location based on signals received from the satellite system. The GPS devices are popular amongst various user groups, and are used by both private and professional users. Another recently introduced concept is based on position information provided by means of cellular telecommunication network apparatus arranged to provide a service referred to as a location service (LCS).

The electronic navigators may be adapted to verify if the user thereof is heading in the right direction and/or if the user is deviating from a predefined path of movement between a starting location and a destination location. The devices may be adapted to alert the user if he/she is off the course or if the user is moving towards a wrong direction.

For example, a sailor may sail substantially long distances in one direction at a time. The modern boats are equipped with electronic navigation aids, such as with the GPS navigation systems or the like, and these systems may be adapted to alert the user in predefined circumstances.

However, for instance in a noisy or dark outdoor conditions, the sailor might not hear or see the alerts from an electronic navigator. Furthermore, the navigator display may be out of the sailors sights or too far that he/she could hear it. The same applies e.g. for a driver of a car or a pedestrian who, while concentrating on the traffic, may not have time to have a look to the map (electronic or conventional) or a display of the navigation system. Furthermore, reading of a map and/or use of a navigator device may require special knowledge. Some people may lack these skills and/or otherwise find the use of these navigation aids difficult.

SUMMARY OF THE INVENTION

Embodiments of the present invention aim to address one or several of the above problems of the prior art navigation aids.

According to one aspect of the present invention, there is provided a navigation system comprising at least one tactile actuator adapted to provide tactile navigation stimulus for the user of the system, and a controller for controlling the operation of the at least one tactile actuator based on information associated with the position of the user.

According to another aspect of the present invention there is provided a navigation method. In the method the position of a user of a navigation apparatus is first determined. A direction to which the user should move is also determined. Guidance is then provided to the user by means of tactile navigation stimulus, said stimulus being generated based on information associated with the determined position of the user and said direction.

According to another aspect of the present invention there is provided a portable navigator apparatus, said apparatus comprising at least one tactile actuator adapted to provide tactile navigation stimulus for the user of the apparatus, and a controller for controlling the operation of the at least one tactile actuator based on information associated with the position of the user.

The portable navigation apparatus may comprise means for determining information associated with the position of the user. At least one of the tactile actuator means may be adapted to provide stimulus based on vibration, heat, electric shock or pressure.

The position information may comprise information that is associated with the direction of movement of the user. The position information may alternatively or in addition comprise information associated with the geographical location of the user.

Means for detecting the direction the user is heading to may be provided. Means for providing information associated with the geographical location of the user may be provided.

The operation of the at least one tactile actuator may be based on information associated with a destination location of the user.

The controller may be adapted to define a route between a location on the way to a destination location and the destination location. The controller may also be adapted to define the position of the user relative to said defined route and to operate the tactile actuator to guide the user to follow said defined route.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

The embodiments relate to provision of a navigation aid that is capable of providing tactile stimulus to the user thereof. The tactile or haptic navigation stimulus is provided for the user based on information regarding the position of the user. The position information may comprise information regarding the direction the user is heading to and/or information regarding the geographic location of the user. The stimulus is provided to the user by tactile actuator means which are arranged so that the user does not need to have visible or audio contact with the navigation aid. That is, the user does not need to see or hear the navigator device to be able to receive information that the user may find useful when trying to reach his/hers destination location.

In a preferred form the tactile stimulus is provided for the user by means of at least one vibrating actuator.

Figure 1:
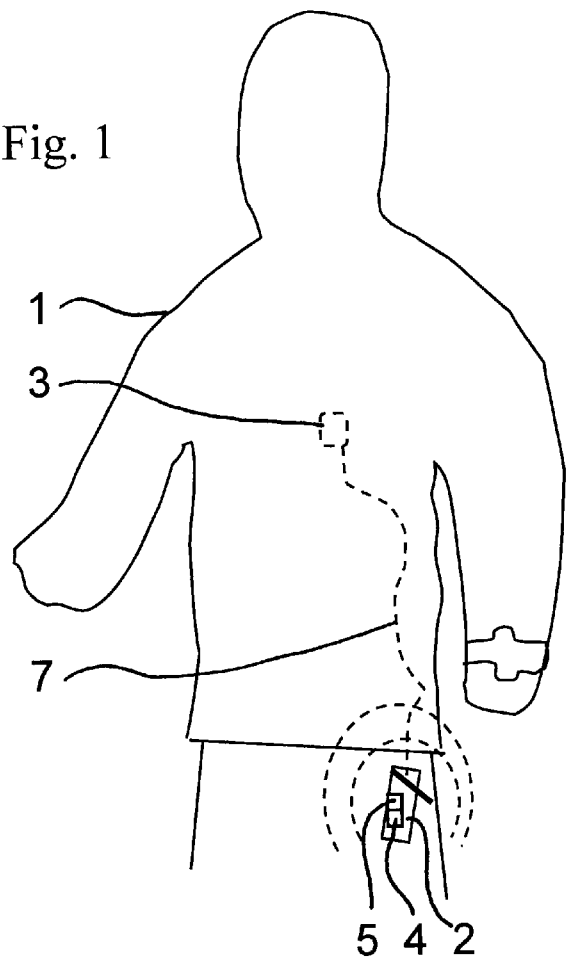
FIG. 1 shows an embodiment of the present invention.

FIG. 1 shows an embodiment in which a user 1 is unobtrusively provided with navigational aid by means of a mobile station 2. The mobile station 2 is provided with a vibrator means 4. In the basic form the arrangement is such that the user 1 has the vibrating mobile station 2 in his hand or pocket or otherwise in contact with his body.

The vibrator means 4 may be arranged similarly to those vibrator arrangements which are in use in the so called vibrating mobile telephones. The user of the navigator device can sense these vibrations in a manner similar to sensing the incoming calls. Various possibilities for the provision of a vibrating mobile station are known and are thus not described in more detail. It is sufficient to note that the vibrating stimulus may be provided by the mobile station itself or by means of an accessory attached to the mobile station. Such an accessory may be e.g. an auxiliary vibrator device or a vibrating battery.

The operation of the vibrator means is controlled by a controller 5 also provided in the mobile station 2. The controller may be any data processor device that is capable of processing position data and controlling the vibrator means so that a tactile stimulus can be provided if necessary during the navigation process. The controller is preferably based on appropriate microprocessor technology. Examples of possibilities for the provision of the position data are briefly discussed after the following discussion of the operation of the FIG. 1 device.

Figure 2:
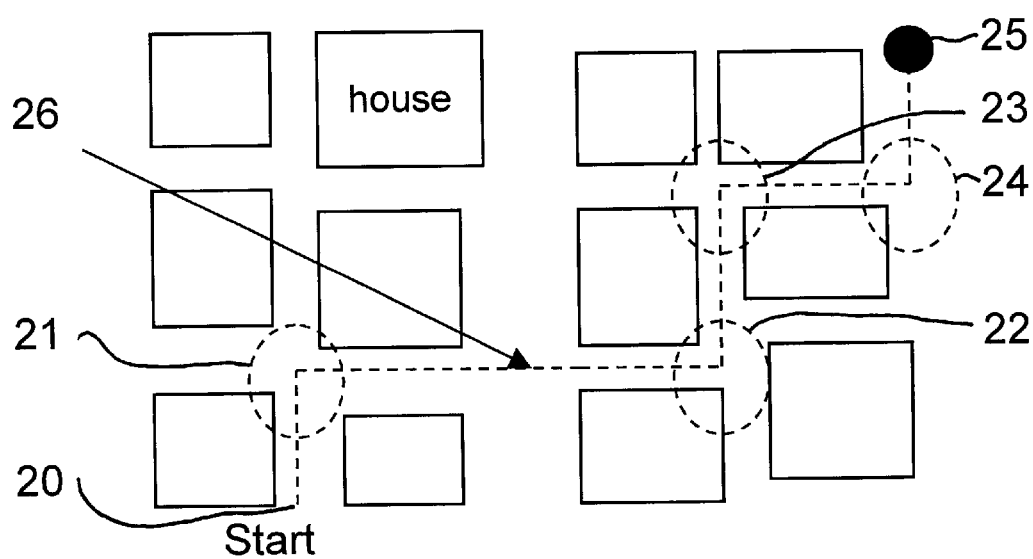
FIG. 2 and 3 are top views showing how the user of a navigator device can be guided towards a destination.
Figure 3:
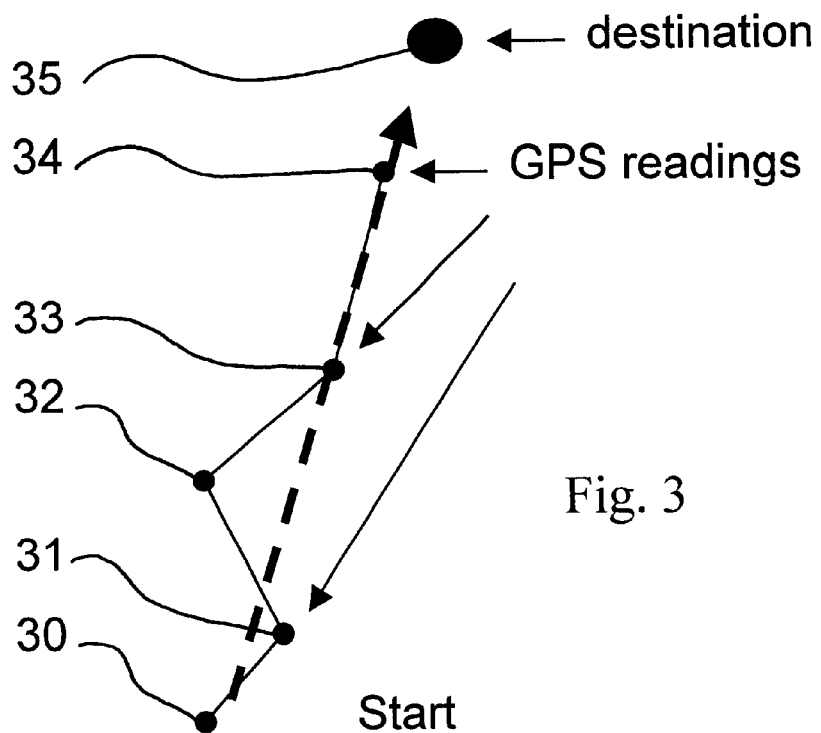
Figure 4:
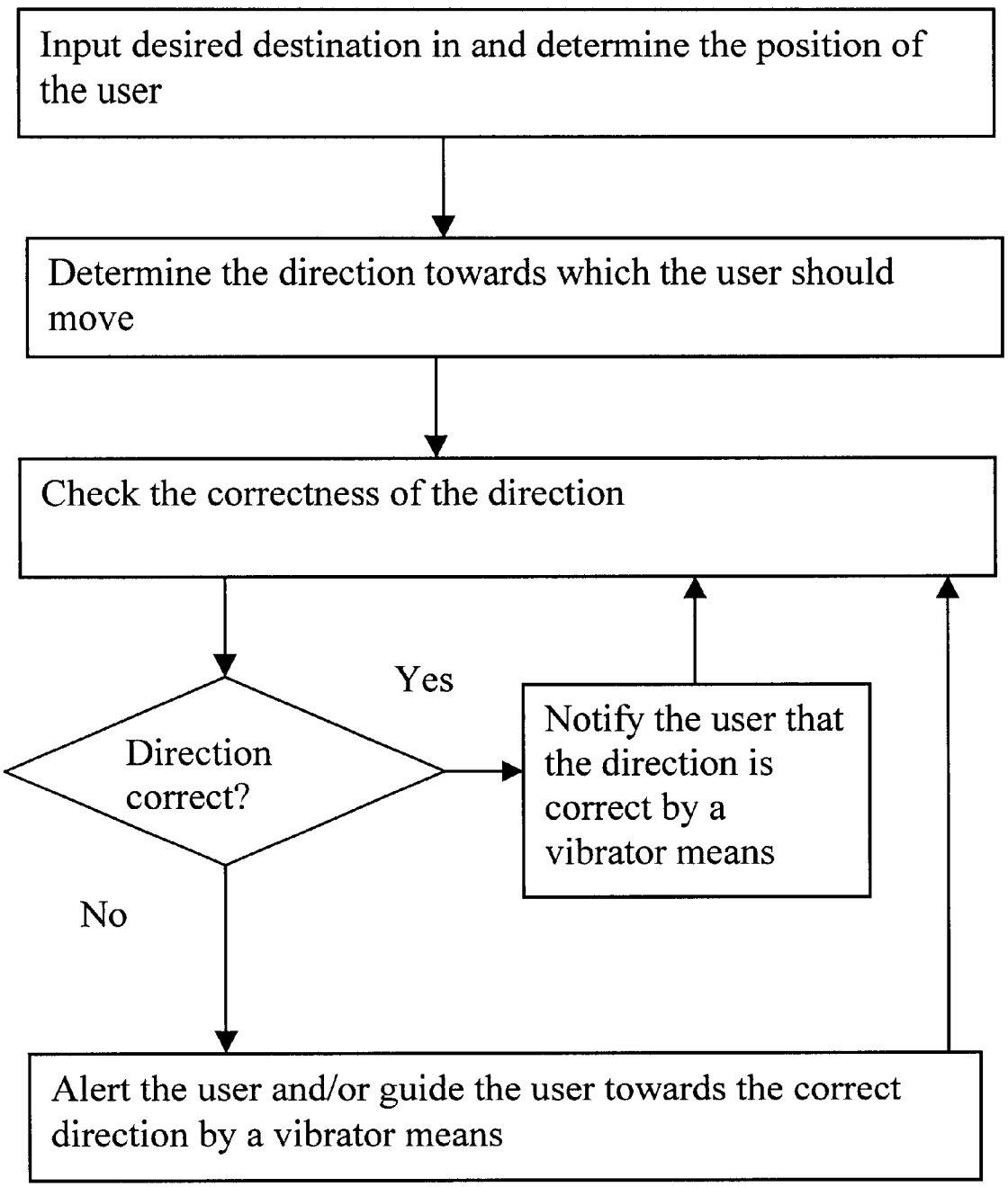
FIG. 4 is a flowchart illustrating the operation of one embodiment of the present invention.

In operation, the vibration generated by the vibrating mobile device 2 can be used to alert the user if he/she is heading towards a wrong direction and/or is in a wrong path of movement. In a simple form of operation a vibrating mobile station 2 works as an indication that it is time to consult a map, or take some other measures to correct and/or check the direction of movement. FIGS. 2 and 3 and also flowchart of FIG. 4 illustrate more specific examples of the manner how the user 1 may be aided by means of the tactile navigator device.

The user may initiate the navigation by giving a desired destination to the navigators device. The destination may be input to the device e.g. by clicking the destination from an electronic map or by inserting co-ordinates of the destination. A possibility is to input the name or other identifier of the destination to the device. The co-ordinates or other actual location may then be fetched from the database based on the name or other identifier. The database may be located e.g. on a server or the device itself may have a database of named locations.

The name, other identifier, the geographical co-ordinates of the destination or other information that associates with the navigation may be communicated over a wireless interface to the navigator device. The communication between the navigator device and a network element may employ wireless communication method that is based on use of text or binary data. For example, the communication may be based on Short Message Service (SMS), Multimedia Messaging System (MMS) or the like.

The input of the destination may be used to trigger position determination procedure so as to determine the current position of the navigation device and thus the user. The possible techniques for the determination will be explained later. After the current location of the user is determined, the navigator device determines the direction the user should move. An indication of the determined direction is then given by means of the vibrating means. As the user moves towards the destination the navigator device checks whether the direction is correct or not, and may provide guidance to the user accordingly by means of the vibrating means.

For example, in the FIG. 2 situation the user may input the street address of the destination to the navigator device. The navigator device may then determine the current i.e. the starting location 20 of the user e.g. based on GPS information and/or information from a digital compass. The navigator device may determine an optimised route to the destination 25, i.e. define a desired path of movement the user should follow. A dashed line designated by 26 illustrates such a desired route in the FIG. 2 situation. Circles 21 to 24 on the recommended route 26 indicate locations in which the navigator device gives instructions to the user either to turn to right (points 21, 23) or left (points 22, 24) by means of vibrations. Examples of the different types of vibrations that may be used to instruct the user are discussed below.

The controller unit 4 of the navigation device 2 may be provided with the latest direction vector of the user 1. This direction vector is compared to the theoretic or recommended direction towards the destination. This operation is illustrated by FIG. 3. In FIG. 3 guidance is given for the first time to the user at the starting point 30. Subsequent guidance is then given at locations 31 to 34 between the starting and the destination locations 30 and 35.

If the controller determines in any of the locations 31 to 35 that the direction the user 1 has taken does not substantially correspond to the recommended direction or the direction that was set as a desired route to be followed, then the user may be alerted by means of the vibrator element. Thus, in location 31 the user 1 was corrected to the left.

However, the device subsequently determined that the user turned too much on the left. Thus in location 32 the user was guided to the right. At point 33 the controller determined that the user is on the correct route. A confirmation of the correct route may be given in such instances to the user. A final check was made at point 34. Since the user was still on the correct route, no correction was required and thus the user was allowed to continue directly towards the destination location 35.

A tolerance may be defined for the direction determination procedure. That is, as long as the direction vector and/or path of movement is substantially correct and remains within predefined limits, no alert or correction instruction will be given. The tolerance allows the direction vector to vary temporarily while the overall direction vector and/or path of movement remains within acceptable limits. This may be advantageous e.g. in circumstances where the user has to circumvent obstacles such as rocks, trees, buildings and so on.

The position and/or direction data to be used by the controller of the navigator device may be provided with any appropriate technique. Some of the possible techniques will be discussed in the following.

A digital compass may be used to define the direction the user moves and/or the correctness of the path of movement of the user. The digital compass may be held in the hand or pocket of the user. According to a possibility shown by FIG. 1 a digital compass 3 is attached on the chest of the user 1. The compass 3 is connected to the mobile station 2 by connection means 7.

The digital compass is preferably placed substantially stationary so that the readings thereof can be made as reliable as possible. If the user holds the compass in his/hers hand, it may be necessary to keep the hand still during the direction determination process, as otherwise the readings may vary depending on the position of the hand. It is also possible to use self correcting compasses. These may be based on use of a gyroscope. A digital accelerometer may also be used to improve the reliability of a digital compass.

The correct path of movement and/or direction of movement can also be determined based on information from the GPS system or a more accurate version thereof referred to as DGPS (differential GPS). The direction and/or path is preferably determined by comparing consecutive position readings and calculating the direction and/or path based on the readings.

It is also possible to determine the speed of the user based on the GPS readings. Due to the substantially good accuracy provided by the GPS devices, even 5 meters difference in distance between two subsequent position determinations may be enough in order to enable determination of an accurate direction vector.

A possibility is to use location data provided by a location service (LCS) implemented by means of a cellular telecommunications system. The LCS service is known by the skilled person. The location service typically comprises one or several location services (LCS) nodes adapted to provide position data services for clients. The location data may be determined e.g. based on techniques, such as MO-LR (mobile station originated location request), ED-OTD (enhanced Observed time difference) and so on. In general terms, the LCS node can be defined as a function or entity capable of providing information concerning the geographical location of mobile stations subscribing the system. A more detailed description of a possible location service can be found, for example, from ETSI (European telecommunications Standards Institute) technical specification "Location Service" GSM 03.71 or 3GPP specification No. 3GT523. 171 version 3.1.0 "Location Services (LCS); Service Description".

The navigation system may be adapted to generate different vibration patterns. The different patterns may be used to provide additional and/or more precise guidance for the user while he/she navigates towards the desired destination location. For example, if the vibrator means is placed in the right pocket of the trouser or on the right chest one single long period of vibration may mean that the user should adjust the movement path to the right. Two or three short vibrations may indicate that the path should be adjusted to left. One single short vibration every now and then may indicate that the user is heading on the right direction or is on the right path.

Normally the mobile station 2 placed in the pocket of the user 1 is close enough to the user so that it is in contact with the user's body. Thus the user 1 will recognise the vibration thereof. The user 1 may also have the mobile phone 2 in his/hers hand while navigating towards the desired destination.

According to an alternative, the vibrator means may be provided in a form of a separate vibrating element. In FIG. 1 such separate vibrating element could be attached in a chest-worn belt and be located in a manner similar to the element 3. The separate vibrating element and the mobile station may be connected by means of a wire. It is possible to connect the station 2 and the remote vibrating element by means of a wireless connection. The wireless connection may be based on appropriate radio transmission techniques such as the Bluetooth™ or infrared links.

Figure 5:
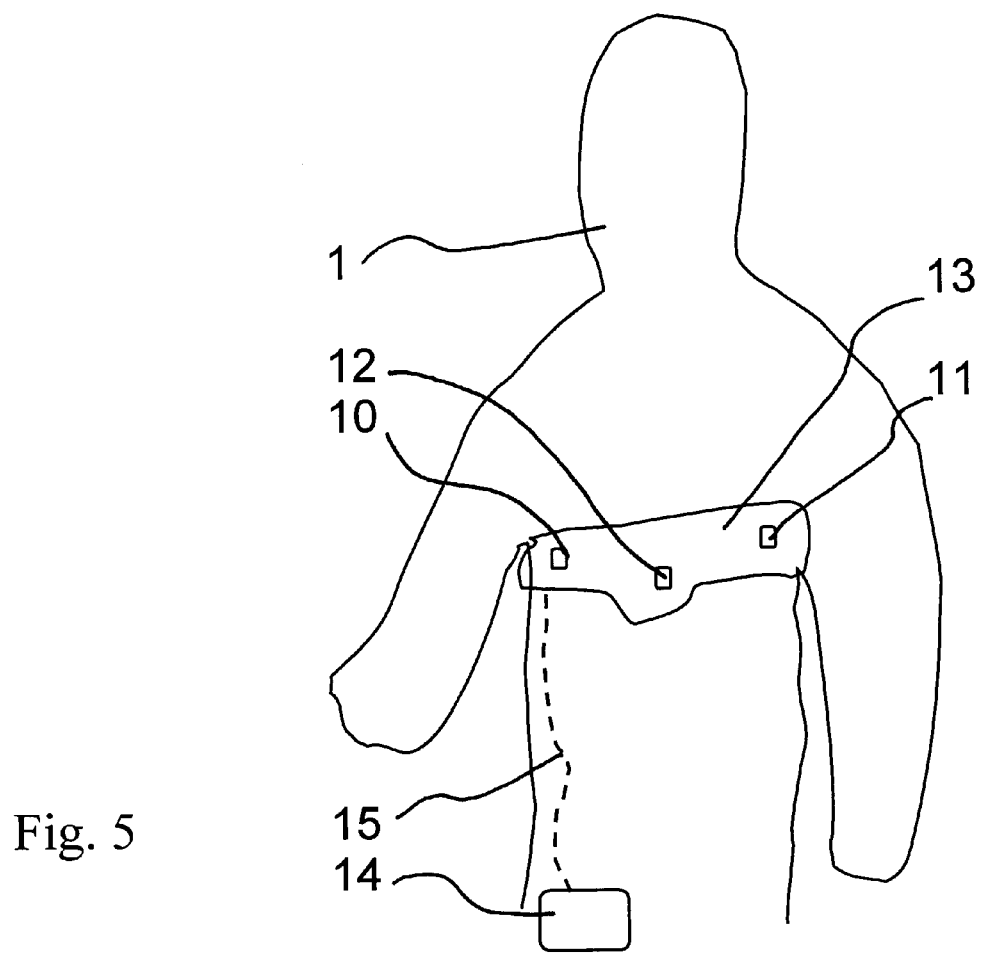
FIG. 5 shows another embodiment of the present invention.

FIG. 5 shows another embodiment employing a plurality of vibrating means. More particularly, a plurality of vibrator elements 10 to 12 is provided on a chest-belt 13. The vibrator element may be embedded within the belt 13. The vibrator elements 10 to 12 may alternatively be attached on the inner surface of the belt 13 so as to ensure a contact between the elements and the chest of the user 1. The vibrating mechanisms of the elements 10 to 12 may be arranged similarly to the vibrating actuators employed by the vibrating mobile phones.

The operation of the vibrating elements is controlled by a controller device 14. The controller device may be any device provided with required processor facility to be able to implement the control function. An example of such as controller device is a personal data assistant (PDA).

The controller 14 is adapted to provide guidance to the user 1 by processing position data and information regarding the destination of the user, as was already explained above. It shall be appreciated that it is not necessary in all embodiments for the navigator arrangement to be aware of the actual location of the user, but it may be enough if the navigator is provided with directional information.

The controller device 14 may also be provided with means for determining the position information such as the geographical location and/or the direction of movement of the user 1. Thus the controller 14 is capable of providing the user with unobtrusive gaze-free navigational aid. For example, the controller unit 14 may be provided with a GPS, DGPS or equivalent, E-OTD or equivalent cellular network based positioning function and so on. The controller unit 14 may also or alternatively be provided with a digital compass for the provision of the directional information.

The separate vibrating elements 11 to 13 and the controller 14 may be connected by means of a wire 15. As in the FIG. 1 embodiment, it is also possible to connect the controller and the vibrating elements by means of a wireless connection. The wireless connection may be based on appropriate radio transmission techniques such as the Bluetooth™ or infrared links.

The chest belt 13 may have additional functions such as be a heart rate monitor-belt. Such belts are known and popular among e.g. joggers. These belts may also be used by old people in order to monitor their condition. Such belts are marketed e.g. by Polar Electro (Finland).

Figure 6:
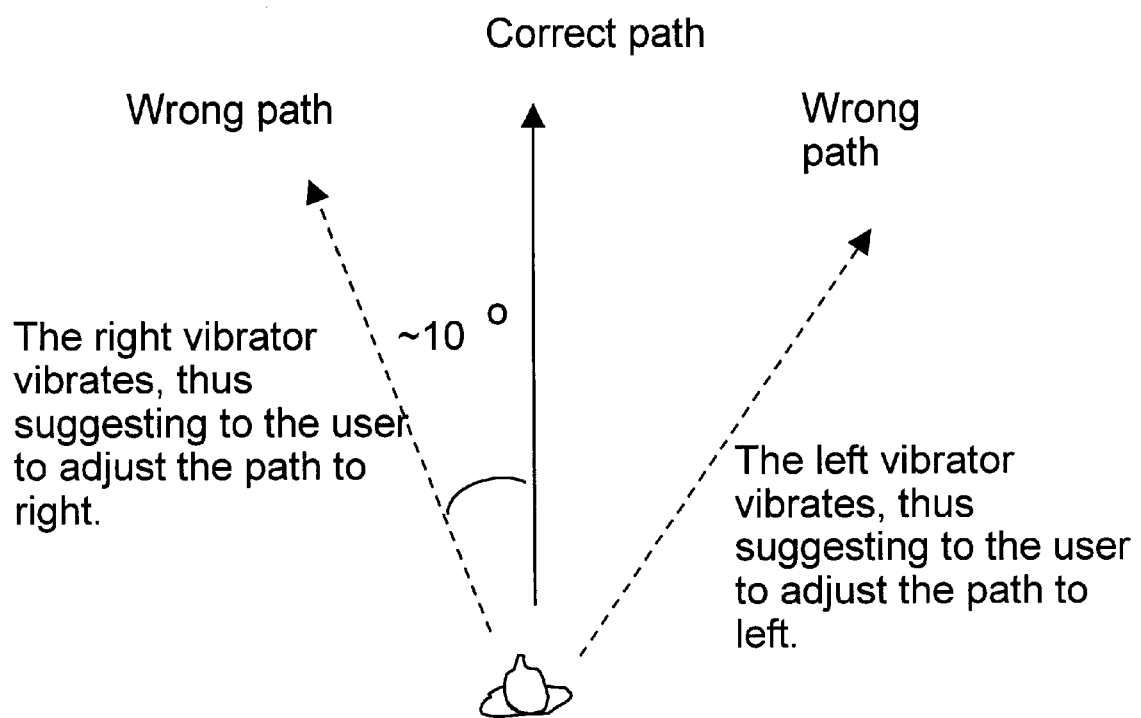
FIG. 6 is a top view illustrating the possible directional instructions given by the FIG. 5 device.

In operation, the navigation controller unit 14 may control the operation of the vibrators 11, 12 and thus provide the user 1 with guidance information. The guidance information may be provided based on information regarding the direction of movement of the user 1. For example, as illustrated by FIG. 6, if the user 1 is moving in a wrong direction, a vibrator element vibrates on the side of the chest in which the user should be heading to. The user 1 does not need to visually look at the controller device 14 or listen any sound signals therefrom.

When the user 1 is facing and/or moving towards the correct direction, the vibrator elements may stay still. Alternatively, the middle vibrator element 12 of FIG. 5 may be arranged to vibrate when the direction is correct. In the absence of the vibrator 12, vibrators 10 and 11 may be arranged to vibrate at the same time thereby indicating that the direction is correct. A further possibility is that vibration stimulus by a vibrator that is other that the left or right vibrator 10 or 11 or a simultaneous vibration by more than one vibrator indicates that the user 1 is moving in a completely wrong direction and should turn back, or at least consult a map.

The navigator device may be adapted to give any other indications by the stimulus as well. For example, the navigator may indicate that there might be problems associated with e.g. the reliability of the navigation instructions or the operational conditions of the apparatus (e.g. a weak battery). For example, the navigator may receive too weak of a signal from the GPS satellite or other positioning system, and may thus not be able to determine accurate direction vectors and/or other direction indicators. Thus the navigator may give a predefined stimulus notifying the user that the reliability thereof is not in a normal/acceptable level.

In embodiments based solely on use of the GPS, DGPS or similar technique, the system may be enabled to calculate the direction of the user only when the user has moved at least a few meters. If the user stops, and then turns, the controller of the navigation system may not be able to detect this. The navigation system may thus not be able to tell the correct direction until the user moves again. However, it should be enough in a usual case if the user walks say 2 to 5 meters, after which the navigation system should again know the direction of the movement vector. In addition, this situation can be remedied by provision of a the digital compass function.

Magnetic fields and/or big metal objects may in some circumstances cause interference to the digital compass. However, sudden changes in compass reading can be filtered out by known techniques, such as by mean value computations. If another position information provision system is also employed, the reading of the digital compass can be easily confirmed based on information e.g. from the GPS system. Different accelerometers may also be used to improve the reliability of the operation of the digital-compass-only navigators.

The tactile stimulus provision is also applicable in the case of remotely giving guidance instructions to a user regarding the direction where he/she should head to. For example, the position of the user may be followed based on an appropriate tracking device, such as those based on the GPS. In a remote control centre an operator may give guidance instructions regarding the direction the user should head to. These instructions are signalled over a radio interface to a mobile station of the user. The mobile station may then guide the user accordingly by means of one or more vibrating elements.

In a preferred embodiments the navigator device comprises a controller facility to accomplish the computations that associate with the navigation process. However, centralised controlling computations may be accomplished by a controller function implemented by mean of a navigation service server in the network side. This type of operation may be employed e.g. in applications where the navigator device is adapted to receive location data from a centralised location service such as by means of the LCS service described above e.g. via the cellular communication system. The navigation service may be provided by a third party service provider.

It should be appreciated that whilst embodiments of the present invention have been described in relation to vibrating elements, embodiments of the present invention are applicable to any other suitable type or indicator arrangements that are capable of providing tactile guidance to the user. The only requirement in this sense is that the alerting actuator element is capable of providing the user with a stimulus such that the user does not need to have a visual contact with a navigator device and/or to listen any audio messages from a navigator device.

For example, the tactile actuator element may be adapted to give a small but noticeable electric shock to the user.

Another possibility is to produce a noticeable pressure against the users body. For example, an appropriate pressure element may be arranged to surround the arm or leg (or both arms or legs) of the user. A possibility is to use heat producing tactile actuator means that produce a stimulus that the user may detect as a change on the temperature of the actuator. For example, the actuator means may be adapted to vary the temperature the user detects based on use of thermal resistance.

It shall also be appreciated that more than one different stimulus producing technique may be employed by a navigator apparatus.

According to a further embodiment the navigator apparatus is also adapted to provide stimulus which indicates the distance to the destination. For example, a weak vibration may indicate that the destination is substantially far away while a strong vibration may indicate that the destination is substantially close. A "cold" actuator may indicate a substantially remote destination while a "hot" actuator may indicate that the destination is substantially close and so on. The distance information may also be indicated by different stimulus patterns or combinations of different indications provided by different stimulus techniques.

The embodiment of the present invention has been described with reference to some specific positioning systems. It shall be appreciated that this invention is also applicable to any other positioning techniques such as those positioning system provided by means of terrestrial location stations or telecommunication network elements as well as any hybrids thereof.

It should also be appreciated that the mobile station 1 of FIG. 1 and/or the controller unit 14 of FIG. 5 may also be e.g. in the form of a so called watchphone or a wristphone.

The embodiments may enable navigation applications in which the user may concentrate fully on moving (e.g. running) and observing the path and surroundings (e.g. traffic and other pedestrians). Drivers are freed to concentrate on driving and other traffic. Sailors may relax until the next vibrating alert. In addition, a navigator provided with a tactile stimulus generating means may be used to provide support when reading a map and/or using a GPS device. There are also several other uses, such as military use, in which the tactile navigation may be found as advantageous since the users are freed from paying attention to a map or a navigation device and may concentrate observing the terrain and so on. The user of the navigator device does not need to confirm the path by looking at the device, but information regarding the correctness thereof is signalled to the user in an unobtrusive manner.

It is noted herein that while the above describes exemplifying embodiments of the invention, there are several variations and modifications which may be made to the disclosed solution without departing from the scope of the present invention as defined in the appended claims.

What is claimed is:

1. A navigation system comprising
   means for detecting the direction of movement of a user of the system;
   at least one tactile actuator adapted to provide directional guidance by means of tactile navigation stimulus for the user of the system; and
   a controller for controlling the operation of the at least one tactile actuator based on information associated with the detected direction of movement of the user.

2. A navigation system as claimed in claim 1, wherein the controller comprises a portable unit that is carried by the user.

3. A navigation system as claimed in claim 1, wherein the controller is further configured to use information associated with the geographical location of the user when controlling the operation of the at least one tactile actuator.

4. A navigation system as claimed in claim 1, wherein the controller comprises a controller unit that is located remotely from the user.

5. A navigation system as claimed in claim 1, wherein the means for detecting the direction comprise a digital compass.

6. A navigation system as claimed in claim 1, wherein the means for detecting the direction comprise a digital accelerometer or a gyroscope.

7. A navigation system as claimed in claim 1, wherein the controller is adapted to determine the direction based on at least a first and a second geographical location that have been determined for the user.

8. A navigation system as claimed in claim 1, comprising means for providing information associated with the geographical location of the user.

9. A navigation system as claimed in claim 8, wherein the means for providing the location information comprise at least one of the following systems: a global positioning system (GPS); a differential GPS (D-GPS); a location service provided by means of a cellular communication network.

10. A navigation system as claimed in claim 1, wherein the operation of the at least one tactile actuator is also controlled based on information associated with a destination location of the user.

11. A navigation system as claimed in claim 10, comprising user interface for input of information associated with the destination location.

12. A navigation system as claimed in claim 1, wherein the controller is adapted to define a route between a location on the way to a destination location and the destination location.

13. A navigation system as claimed in claim 12, wherein the controller is adapted to define the position of the user relative to said defined route and to operate the tactile actuator to guide the user to follow said defined route.

14. A navigation system as claimed in claim 1, wherein the tactile actuator is provided in association with a mobile station.

15. A navigation system as claimed in claim 14, wherein the mobile station is a mobile station for communication via a cellular communication network.

16. A navigation system as claimed in claim 1, wherein at least one tactile actuator is attached to the body of the user by means of a belt.

17. A navigation system as claimed in claim 16, wherein the belt is a chest belt.

18. A navigation system as claimed in claim 1, wherein at least two tactile actuators are provided.

19. A navigation system as claimed in claim 18, wherein each of the tactile actuators is for indication of a predefined direction.

20. A navigation system as claimed in claim 1, wherein at least one tactile actuator is a separated element from the controller and wherein the control instructions are communicated from the controller to the separated element via a wireless interface.

21. A navigation system as claimed in claim 1, wherein at least one tactile actuator provides the stimulus by means of vibration.

22. A navigation system as claimed in claim 21, wherein different vibration patterns are provided.

23. A navigation system as claimed in claim 1, wherein at least one tactile actuator is adapted to provide stimulus based on a stimulus that has been selected from the following list: heat; electric shock; pressure.

24. A portable navigator apparatus, comprising:
    at least one tactile actuator adapted to provide directional guidance by means of tactile navigation stimulus for the user of the apparatus; and
    a controller for controlling the operation of the at least one tactile actuator based on information associated with the direction of movement of the user.

25. A portable navigation apparatus as claimed in claim 24, comprising means for determining information associated with the position of the user.

26. A portable navigation apparatus as claimed in claim 24, the position information comprises at least one direction vector.

27. A portable navigation apparatus as claimed in claim 24, wherein the position information comprises information associated with the geographical location of the user.

28. A portable navigation apparatus as claimed in claim 24, wherein at least one of the tactile actuators is adapted to provide stimulus based on a stimulus that has been selected from the following list: vibration; heat; electric shock; pressure.

29. A navigation method comprising:
    determining the direction of movement of a user of a navigation apparatus;
    determining a direction to which the user should move; and
    providing directional guidance to the user by means of tactile navigation stimulus,
    wherein said stimulus is generated based on information associated with the determined direction of movement of the user and said direction.

30. A method as claimed in claim 29, wherein direction information is processed based on direction vectors.

31. A method as claimed in claim 29, comprising the further step of determining information associated with the geographical location the user.

32. A method as claimed in claim 29, comprising a step of inputting information associated with a destination of the user.

33. A method as claimed in claim 29, comprising steps of defining a desired route between a location of the user and a destination location and providing the guidance based on said desired route.

34. A method as claimed in claim 29, wherein a first tactile actuator is operated to guide the user to a direction and a second tactile actuator is operated to guide the user to another direction.

35. A method as claimed in claim 29, wherein a tactile navigation stimulus is generated in response to detection that the user has deviated more than a predefined amount from said direction.

36. A method as claimed in claim 29, wherein the tactile navigation stimulus is provided by means of at least one of the following techniques: vibration; heat; electricity; pressure.

37. A method as claimed in claim 29, wherein different stimulus patterns are provided.

38. A method as claimed in claim 32, wherein the user is provided with a tactile navigation stimulus that is indicative of the distance to the destination.

39. A method as claimed in claim 29, wherein the user is provided with information associated with the quality of the tactile navigation stimulus.

40. A method as claimed in claim 39, wherein the user is informed of the reliability of the tactile navigation stimulus by means of a further stimulus generated by the navigation apparatus.

* * * * *